United States Patent [19]

Tsuchiya et al.

[11] 4,419,497

[45] Dec. 6, 1983

[54] PROCESS FOR PRODUCING NOVEL HYDROGENATED RESIN FROM FIVE-MEMBER CYCLIC COMPOUNDS HAVING A CONJUGATED DOUBLE BOND AND/OR DIELS-ALDER ADDITION PRODUCTS THEREOF

[75] Inventors: Shozo Tsuchiya, Tokyo; Akio Oshima; Hideo Hayashi, both of Yokohama, all of Japan

[73] Assignee: Nippon Oil Company, Limited, Tokyo, Japan

[21] Appl. No.: 378,680

[22] Filed: May 17, 1982

[30] Foreign Application Priority Data

Aug. 22, 1979 [JP] Japan ................... 54-106109
Aug. 23, 1979 [JP] Japan ................... 54-106606
Nov. 14, 1979 [JP] Japan ................... 54-146442
Jun. 6, 1980 [JP] Japan ................... 55-75453
Jun. 6, 1980 [JP] Japan ................... 55-75454

[51] Int. Cl.³ ........................................... C08F 8/04
[52] U.S. Cl. ................... 525/338; 428/344; 428/355; 523/172; 524/294; 524/296; 524/407; 524/423; 524/426; 524/432; 524/442; 524/518; 525/211; 525/290; 525/332.1; 525/339; 526/75; 526/76
[58] Field of Search ...................... 525/338, 339

[56] References Cited

U.S. PATENT DOCUMENTS 3,084,147 4/1963 Wilks ................... 526/283

FOREIGN PATENT DOCUMENTS 894888 3/1972 Canada .
1356309 6/1974 United Kingdom .

*Primary Examiner*—Stanford M. Levin
*Attorney, Agent, or Firm*—Jordan and Hamburg

[57] ABSTRACT

According to the present invention, there is disclosed a process for producing a novel resin which comprises the step of copolymerizing a five-member cyclic compound (component A) having a conjugated double bond and represented by the general formula (A) given below:

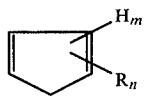

GENERAL FORMULA (A)

wherein R is an alkyl group having from 1 to 3 carbon atoms; m and n are zero or integers not less than 1 and are in the relation of $m+n=6$; and/or a Diels-Alder addition product thereof (A) with a co-dimer (component B) of said five-member cyclic compound and 1,3-butadiene by heating a mixture of 20 to 90 parts by weight of said component A and 80 to 10 parts by weight of said component B at a temperature of from 200° C. to 350° C. Also disclosed are a process for hydrogenating said novel resin to produce a novel hydrogenated resin and resin compositions containing said hydrogenated resin.

15 Claims, No Drawings

PROCESS FOR PRODUCING NOVEL HYDROGENATED RESIN FROM FIVE-MEMBER CYCLIC COMPOUNDS HAVING A CONJUGATED DOUBLE BOND AND/OR DIELS-ALDER ADDITION PRODUCTS THEREOF

This is a continuation of application Ser. No. 177,536, filed Aug. 13, 1980, now abandoned.

BACKGROUND OF THE INVENTION

1. Field of the Invention

The present invention relates to a process for producing a novel resin by heating to copolymerize a five-member cyclic compound having a conjugated double bond and/or a Diels-Alder addition product thereof, with a co-dimer of said five-member cyclic compound and 1,3-butadiene, a process for producing a novel hydrogenated resin further including the step of hydrogenating said novel resin and a resin composition containing said hydrogenated resin.

2. Prior Art

It has been already known, for example, from U.S. Pat. No. 3,084,147 that a resin soluble in an organic solvent may be produced from a five-member cyclic compound having a conjugated double bond and/or a Diels-Alder addition product thereof by heating highly pure dicyclopentadiene at a temperature of from 260° C. to 290° C. However, the resin produced by this known process is thermally unstable. Besides, a resin having a higher softening point produced thereby tends to be excessively colored and to be deteriorated in solubility in an aliphatic hydrocarbon solvent.

On the other hand, efforts have been made to produce resins by the copolymerization of cyclopentadiene or dicyclopentadiene with diolefins, and as an example of the fruits of such efforts, British Patent No. 1,356,309 discloses a method of producing a resin by the copolymerization of monomer or dimer of cyclopentadiene with 1,3-butadiene. However, the resin produced by this method is liquid and a resin having a high softening point cannot be produced by this prior art method.

In the meanwhile, there is an increasing demand for a resin composition which may be used as a hot-melt composition, a hot-melt traffic paint composition, a hot-melt tackifier composition and a pressure-sensitive tackifier composition. As the tackifying resinous component or the bonding resinous component, natural resins such as rosin and terpene type resins have been widely used. However, these natural resins are unstable in cost and supply and recently replaced by hydrocarbon resins of petroleum type. However, the prior art hydrocarbon resins of petroleum type have disadvantages in that they are poor in tackifying or bonding property and also unsatisfactory in weather-proof and heat resistant properties with attendant disadvantage of inferior hue.

In order to improve the hue and the heat resistant property of the hydrocarbon resins of petroleum type used in hot-melt compositions, attempts have been made to use aromatic petroleum resins or completely hydrogenated cyclopentadiene type resins. However, these resins are extremely poor in tackifying property, thus leading to reduction in peeling strength.

Although a maleic acid resin modified with rosin is used in a hot-melt traffic paint composition, it is inferior in whiteness and apt to suffer cracking. Therefore, hydrocarbon resins of petroleum type produced from the by-product cracked oil fractions obtained by the thermal cracking of petroleum or the like have been increasingly used up to date in consideration of the merits of cheaper cost and stable supply. However, when an aliphatic hydrocarbon resin produced from a cracked oil fraction containing unsaturated aliphatic hydrocarbons having boiling points ranging within 20° C. to 100° C. is used in a hot-melt traffic paint composition, disadvantages are revealed such that the fluidity becomes worse, that fillers tend to precipitate and that occurence of cracking becomes appreciable. Altnernatively, an aromatic hydrocarbon resin produced from a cracked oil fraction containing unsaturated aromatic hydrocarbons having boiling points ranging within 140° C. to 280° C. cannot be also used as the bonding resin in a hot-melt traffic paint composition, since it is poor in weather-proof and heat resistant properties. Also, thermally polymerized resins obtained by heating to polymerize dicyclopentadienes are unsatisfactory in heat resistant and weather-proof properties and bad odor.

In the field of the pressure-sensitive tackifying composition, petroleum resins and coumarone-indene resins have been conventionally used in place of natural resins. However, they have not yet been accepted as those that satisfy the properties required for the component of the pressure-sensitive tackifying composition, since they are poor in mutual solubility with rubbers. In fact, it is pssible to improve the quality of an aromatic hydrocarbon resin to have the properties substantially equivalent to those of the terpene resin by hydrogenating it to convert all or a portion of its aromatic rings to alicyclic rings. However, such hydrogenation need be effected under a severe condition of high temperature and high pressure. Moreover, such hydrogenation is inconvenient from the economical standpoint of view, since a large amount of hydrogen is consumed and the operational cost is increased because of the deterioration of the catalyst caused by the sulfur content originated from the cracked oil fraction.

U.S. Pat. No. 3,084,147 quoted hereinbefore also discloses that a light color resin can be produced from highly pure dicyclopentadiene by heating to polymerize the same at a temperature of from 260° C. to 290° C. However, this resin is unstable and has only an insufficient adhesive property when it is used as the tackifying resin in a pressure-sensitive tackifying composition.

French Patent No. 1,541,090 discloses that a resin for a pressure-sensitive tackifying composition may be produced from a fraction of cracked petroleum having the boiling point of from 20° C. to 280° C. by heating to polymerize the fraction to obtain a resin which is then hydrogenated. However, the thus produced resin is too broad in its molecular weight distribution and unsatisfactory in adhesive property.

OBJECTS AND SUMMARY OF THE INVENTION

An object of the present invention is, therefore, to provide a process for producing a novel resin which is improved in heat stability and also improved in hue and in solubility in an aliphatic hydrocarbon solvent.

Another object of the present invention is to provide a process for producing a novel hydrogenated resin which has a good hue and which is improved in heat stability and also improved in solubility in an aliphatic hydrocarbon solvent.

A further object of the present invention is to provide a resin composition which is excellent in tackifying property or bonding property.

A still further object of the present invention is to provide a resin composition which has an improved weather-proof property.

A further object of the present invention is to provide a resin composition which has a satisfactory heat resistant property.

A further object of the present invention is to provide a resin composition which has a favorable hue.

A further object of the present invention is to provide a resin composition which is improved in workability and stain-proof property.

Yet a further object of the present invention is to provide a resin composition which is well balanced in its tackifying force, adhesive force and coagulating force.

The above and other objects of the present invention will become apparent more clearly from the description given below.

According to the present invention, there is provided a process for producing a novel resin which comprises the step of copolymerizing a five-member cyclic compound (component A) having a conjugated double bond and represented by the general formula of:

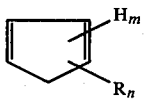

wherein R is an alkyl group having from 1 to 3 carbon atoms; m and n are zero or integers not less than 1 and are in the relation of $m+n=6$; and/or a Diels-Alder addition product thereof with a co-dimer (component B) of said five-member cyclic compound and 1,3-butadiene by heating a mixture of 20 to 90 parts by weight of said component A and 80 to 10 parts by weight of said component B at a temperature of from 200° C. to 350° C.

According to a further aspect of the present invention, there is provided a process for producing a novel hydrogenated resin, which process further includes a step of hydrogenating said novel resin to hydrogenate substantially all the carbon-carbon double bonds in the resin.

According to a still further aspect of the present invention, there is provided a resin composition containing said novel hydrogenated resin to which there is added the one selected from the group consisting of ethylenic copolymers and/or waxes, pigments and/or fillers, block-copolymers represented by the general formula of $(A-B)_n$ or $(A-B)_{n-1}-A$ wherein A is a non-elastomeric polymer block having a glass transition point of higher than 20° C. and an average molecular weight ranging within 5,000 to 125,000, B is an elastomeric polymer block of a conjugated diene having an average molecular weight of 15,000 to 500,000, the polymer block A occupies less than 80 wt % of the block-copolymer, and n is an integer of not less than 2, and natural and synthetic rubbers.

DETAILED DESCRIPTION OF THE INVENTION

The present invention will now be described more specifically.

In the present invention, a five-member cyclic compound or a Diels-Alder addition product thereof having a conjugated double bond and represented by the following general formula is used as a starting material (component A):

General Formula:

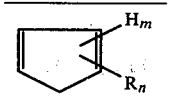

wherein R is an alkyl group having from 1 to 3 carbon atoms; m and n are zero or integers not less than 1 and are in the relation of $m+n=6$.

More specifically, those which may be used preferably in an industrial scale include five-member cyclic compounds such as cyclopentadiene and methylcyclopentadiene, Diels-Alder addition products thereof such as dicyclopentadiene, cyclopentadiene-methylcyclopentadiene co-dimer and tricyclopentadiene, and mixtures thereof, particularly preferred being cyclopentadiene, dicyclopentadiene and a mixture thereof.

It is not essential that the component A be highly pure, but is preferred that there is present 80% by weight or more of cyclopentadiene, dicyclopentadiene or alkyl substituted derivatives thereof. For instance, an exemplified component A which may be used in the present invention includes a concentrated fraction obtained by thermally dimerizing cyclopentadiene and/or methylcyclopentadiene contained in a $C_5$ fraction of the by-product oil formed by cracking naphtha or the like at a high temperature to obtain a mixture including dicyclopentadiene, dimethylcyclopentadiene, cyclopentadiene-methylcyclopentadiene co-dimer, cyclopentadiene-isoprene co-dimer and cyclopentadiene-piperylene co-dimer and then removing the major portion of $C_5$ fractions including $C_5$ olefin and $C_5$ paraffin by means of distillation.

Also, the component A may contain unsaturated ingredients of the petroleum fractions, particularly unsaturated aromatic ingredients, within the amount equal to or less than the total amount of five-member cyclic compounds and/or Diels-Alder addition products thereof. For example, styrene, α-methylstyrene, vinyltoluene, indene, methylindene or a mixture thereof may be used, and a so-called $C_9$-fraction obtained as the by-product at a step of decomposing naphtha or the like is preferred from the industrial standpoint of view.

The component B used in the present invention is a co-dimer of said five-member cyclic compound having a conjugated double bond and represented by the general formula set forth above dimerized with 1,3-butadiene. More specifically, preferable examples are one or more of tetrahydroindene, vinylnorbornene and alkyl substituents tetrahydroindene and vinylnorbornene which are co-dimers of cyclopentadiene and 1,3-butadiene. A small amount of homo-dimer of 1,3-butadiene which is formed as a by-product at the step of preparing the co-dimers of the five-member cyclic compound having a conjugated double bond and 1,3-butadiene may be allowed. Further, vinylcyclohexene may be also contained in an amount up to approximately equal to that of the co-dimers constituting the component B.

Furthermore, in case where the present invention is applied to the preparation of a traffic paint composition, a copolymerizable polar monomer such as maleic acid anhydride, vinyl acetate, methyl methacrylate or allyl alcohol, may be co-existent within a limit not to substantially detract from the merits of the present invention with the aims to improving the miscibility with a pigment or a filler or to further improving the fluidity.

In the present invention, a mixture containing 20 to 90 parts by weight, preferably 30 to 70 parts by weight, of said component A and 80 to 10 parts by weight, preferably 70 to 30 parts by weight, of said component B is heated to copolymerize both components at a temperature of from 200° C. to 350° C., preferbly 220° C. to 320° C., most preferably 250° C. to 300° C., for 30 minutes to 15 hours, preferably for 1 to 7 hours. If the quantity of the component B exceeds the range defined above, the softening point of the formed resin becomes too low and the yield thereof is disadvantageously decreased. On the other hand, if the quantity of the components B is short of the range as defined above, undesirable results are incurred such that the heat stability of the resultant resin is impaired and the solubility in an aliphatic hydrocarbon solvent becomes unsatisfactory. Besides, where such resins are hydrogenated, the activities of catalysts are remarkably lowered. Further, if resin compositions contain the resultant hydrogenated resins, tackifying or bonding powers are lowered, thus being unsatisfactory.

It is desirous that the resin of the present invention has a softening point of from 50° C. to 160° C., preferably from 60° C. to 130° C., and more preferably from 90° C. to 110° C.

A reaction temperature lower than the aforementioned range is not preferred since a transparent resin cannot be formed, whereas a reaction temperature higher than the aforementioned range is also undesirable since the reaction product is partially decomposed and the hue of the resultant resin becomes unfavorable.

It is also possible to use, as the mixture of said components A and B, a fraction containing 10 to 70% of dicyclopentadiene and 30 to 80% of tetrahydroindene, which fraction is obtained by distilling off the major portion of vinylnorbornene from the reaction mixture of the Diels-Alder reaction of 1,3-butadiene with cyclopentadiene. In detail, when 1,3-butadiene and cyclopentadiene are heated to 80° to 150° C. to allow to proceed the Diels-Alder reaction therebetween, a mixture containing vinylnorbornene, tetrahydroindene, vinylcyclohexene, dicyclopentadiene and small amounts of trimers or higher oligomers. The residual fraction of the mixture left after distilling off the major portion of vinylnorbornene contains tetrahydroindene, vinylcyclohexene, dicyclopentadiene and small amounts of trimers or higher oligomers. The mixing ratio of respective ingredients present in the mixture is varied depending on the reaction condition under which 1,3-butadiene and cyclopentadiene has reacted and also on the condition under which vinylnorbornene has been removed. However, in order to produce the resin of the present invention, it is preferred to use a mixture adjusted to contain 10 to 70%, more preferably 20 to 40%, of dicyclopentadiene and 30 to 80%, more preferably 55 to 75%, of tetrahydroindene. In case where the contents of dicyclopentadiene and tetrahydroindene are maintained within the range as aforementioned, the yield of the resin is further increased and the adhesive property of the resultant resin is further improved.

Since the resin of the present invention may be produced from the mixture of the components A and B present in the mixing ratio as defined above, the resin can be produced by the use of the by-product fraction left in the production of vinylnorbornene, which is a useful intermediate material for producing a synthetic rubber from 1,3-butadiene and cyclopentadiene. The purity of industrially available cyclopentadiene is not always 100%, but generally available cyclopentadiene is mingled with a small amount of methylcyclopentadiene or other impurities which form methyltetrahydroindene or other corresponding impurity products at small yield. However, such impurities, as far as the mixing ratios thereof are small, need not be removed purposely. Similarly, the presence of vinylcyclohexene may be permissible, as far as the amount thereof is approximately equal to or less than that of tetrahydroindene.

Although small amounts of respective trimers and co-trimers of 1,3-butadiene and cyclopentadiene and smaller amounts of oligomers of higher order may be formed by the reaction between 1,3-butadiene and cyclopentadiene, these impurities need not be removed purposely as far as the quantities thereof are small.

It is not essential to use a solvent at the thermal copolymerization step of the process of the present invention, but it is preferred that the reaction be carried out in the presence of a solvent to facilitate the control of the reaction. Chemically inert hydrocarbon solvents may be generally used for this purpose, and the representatives being pentane, hexane, heptane, benzene, toluene, xylene, cyclohexane, methylcyclohexane and dimethylcyclohexane.

After the completion of reaction, unreacted starting materials, low molecular weight oligomers and a solvent, if used, are distilled off to obtain the aimed resin.

In the process of the present invention, the mixed ratio of the starting materials, the components A and B as aforementioned, may be varied to control the softening point and the solubility of the resultant resin to be adapted for a variety of uses.

The resins produced by the aforementioned process have light colors and stabilities against heat. However, double bonds are left in the resins. In order to produce resins to meet the requirements of better hue and improved stability against heat, the aforementioned resins are hydrogenated to hydrogenate substantially all the carbon-carbon double bonds in the resin to thereby obtain resins of improved properties. It is meant by the words "to hydrogenate substantially all the carbon-carbon double bonds" that more than 80%, preferably more than 95% of all the carbon-carbon double bonds present in the resin are hydrogenated.

Hydrogenation of the resin may be effected according to the known technique used for hydrogenating general petroleum resins or cyclopentadiene base resins. In detail, the hydrogenated resin of the present invention may be obtained from the aforementioned copolymer resin either by directly hydrogenating the melted copolymer resin or by initially dissolving the copolymer resin in a hydrocarbon solvent such as hexane, heptane, octane, cyclohexane, methylcyclohexane, decalin, benzene, toluene or xylene, and then hydrogenating by the use of a catalyst including one or more of active metals selected from the group consisting of the Group VIII metals such as nickel, palladium, ruthenium, rhodium, cobalt and platinum series metals, the Group VI metals such as tungsten chromium and molybdenum, the Group VII metals such as rhenium and manganese, and copper, the catalyst metal or metals being used directly without being carried or alternatively carried by a solid carrier such as alumina, silica-alumina or diatomaceous earth, and the hydrogenation being effected at a temperature of from 0° C. to 350° C., preferably from 150° C. to 260° C., under a hydrogen pressure of from the atmospheric pressure to 200 kg/cm$^2$. G.

It is desirous that the hydrogenated resin of the present invention has a softening point of from 50° C. to 160° C., preferably from 60° C. to 130° C. and more preferably from 90° C. to 110° C. When a hot melt composition, a hot melt tackifier composition or a pressure-sensitive tackifier composition is prepared by the use of the aforementioned hydrogenated resin having a softening point within said range, the coagulative force of each composition can be further increased and the adhesive property thereof can be further improved. Also, when a hot melt type traffic paint composition is prepared by the use of the hydrogenated resin having a softening point ranging within the aforementioned range, a pigment or filler can be dispersed more uniformly, and the paint adheres to the road surface closer with attendant improvement in workability.

In preparation of a hot melt composition by the use of the hydrogenated resin of the present invention as a tackifying resin component, said hydrogenated resin is mixed with an ethylenic copolymer and/or a wax. The mixing ratio of the hydrogenated resin relative to the ethylenic copolymer and/or wax may be selected in a wide range. However, the usual mixing ratio is such that 20 to 300 parts by weight of said hydrogenated resin and 10 to 400 parts by weight of a wax are mixed with 100 parts by weight of an ethylenic copolymer. The ethylenic copolymers which may be used in the hot melt composition according to the present invention are copolymers of ethylene with polar vinyl compounds, and the typical examples include a copolymer of ethylene and vinyl acetate, a copolymer of ethylene and an acrylic ester and a copolymer of ethylene and a methacrylic ester. The copolymers normally used for this purpose contain 5 to 25 mol % of the polar vinyl compound. Petroleum base waxes such as paraffin wax and microcrystalline wax, natural waxes and synthetic waxes such as polyethylene wax and polypropylene wax may be used depending on the applications.

If necessary, other tackifying resins such as rosin and derivatives thereof or terpene resins may be used together, and 0 to 5 wt % of a filler such as calcium carbonate, titanium oxide, talc or clay, 0 to 5 wt % of an antioxidant, 0 to 20 wt % of a plasticizer and a pigment may be added. When said composition is used for an adhesive for packing materials such as paper, plastics film or aluminium film, a composition containing a relatively small amount of ethylenic copolymer is selected. On the other hand, it is desirous to prepare a composition which contain a large amount of ethylenic copolymer or a composition mainly composed of an ethylenic copolymer and said hydrogenated resin when the composition is used for woodworking and bookmaking purposes where a relatively powerful adhesive force is required.

A hot melt traffic paint composition may be prepared by the use of the hydrogenated resin of the present invention. The hot melt traffic paint contains desired amounts of plasticizer, pigment, filler and glass beads other than a thermoplastic resin (tackifier), and may be melted by heating at 150° C. to 250° C. to be coated on a road surface and then cooled to solidify to form a white or yellow marking line on the road.

The hot melt traffic paint shall meet with the following requirements:

(1) Hue: It must have a white or yellow color, since it is used as a road marking paint which must be easily visible. The thermoplastic resin used therein shall have the heat resistant property so as not to change color or lose its initial whiteness at the melting step prior to coating.

(2) Weather-proof property: It must not be changed to yellowish color after being coated. The adhesiveness to the road surface shall not become poor by the occurrence of cracking.

(3) Workability: A uniform paint composition shall be formed without settling of filler or pigment prior to coating. It must have good fluidity to facilitate the coating operation and to form a uniform coating membrane. It must not have any unpleasant odor.

(4) Stain-proof Property: The coating shall not be stained by the tires of automobiles, dusts or oils.

The hot melt traffic paint according to the present invention contains said hydrogenated resin as the tackifier and pigments and/or fillers. A maleic acid resin, a hydrogenated rosin ester or other resins modified with rosin or a terpene resin may be used together as the tackifier other than said hydrogenated resin. However, the quantity of other tackifiers may be preferably less than 100 parts by weight relative to 100 parts by weight of the hydrogenated resin of the present invention. If the amount of other tackifiers exceeds 100 parts by weight, the resultant traffic paint may be apt to crack.

The hot melt traffic paint according to the present invention may contain, other than said hydrogenated resin and pigments and/or fillers, a plasticizer. Typical examples of the plasticizer used in the present invention include dibutyl phthalate, dioctyl phthalate, dioctyl azelate, dioctyl cebacate, alkyd resins and paraffin wax.

Typical examples of the pigment and/or filler used in the present invention include titanium oxide, zinc flower, chrome yellow, benzidine yellow, calcium carbonate, siliceous sand, talc and calcium sulfate.

The mixing ratio of the hydrogenated resin, the plasticizer, the pigments and/or fillers is 3 to 40 parts by weight, preferably 5 to 20 parts by weight, of the hydrogenated resin, 1 to 15 parts by weight, preferably 1 to 7 parts by weight, of a plasticizer and 20 to 80 parts by weight of pigments and/or fillers, preferably 3 to 30 parts by weight of a pigment and 20 to 50 parts by weight of a filler.

In the hot melt type traffic paint composition according to the present invention, less than 30 parts by weight, preferably less than 20 parts by weight, of glass beads may be added to said composition in order to make visually remarkable during the nighttime. Also, in order to further improve the heat resistant and weather-proof properties, an antioxidant, an ultraviolet light absorbent and a stabilizer against light may be added as desired The hot melt traffic paint according to the present invention may be prepared by adding a plasticizer, a pigment, a filler, glass beads or other desired components to the tackifying resin of the invention while agitating the latter in a molten state, or alternatively by mixing all desired compositions and then melting them together.

A hot melt type tackifier composition may be prepared by the use of the hydrogenated resin according to the present invention by adding it with a block copolymer having elastomeric polymer blocks. The block copolymer which may be used for this purpose is represented by the general formula of $(A-B)_n$ or $(A-B)_{n-1}-A$, wherein A is a non-elastomeric polymer block having a glass transition point of higher than 20° C. and an average molecular weight ranging within 5,000 to 125,000, B is an elastomeric polymer block of a conjugated diene having an average molecular weight of 15,000 to 500,000, the polymer block A occupies less than 80 wt % of the block-polymer and n is an integer of not less than 2.

One or more monomers may be used for constituting the block A in said block copolymer. Such monomers include a variety of compounds such as olefins including ethylene and propylene, aromatic vinyl compounds including styrene, methylstyrene, chlorostyrene, vinyltoluene, vinylxylene and vinylnaphthalene, acrylic compounds including acrylonitrile and methyl methacrylate. One or more conjugated dienes may be used for constituting the block B in said block copolymer. Such dienes include butadiene, isoprene and methylisoprene. Also, the block B of the block copolymer is not necessarily consisting of only conjugated dienes but may include elastomeric random copolymers of dienes and other monomers such as a butadiene-styrene random copolymer and a butadiene-acrylonitrile random copolymer.

Further, the conjugated diene polymer block B includes a hydrogenated polymer block wherein all or a portion of the double bonds is hydrogenated, or may be a block composed of a polyolefin.

As specific examples of the block copolymer, there may be mentioned "Califlex 1101, 1102 and 4113" (Trade Names of the SBS block copolymers produced by the Shell Chemicals Corp.), "Califlex 1107" (Trade Name of the SIS block copolymer produced by the Shell Chemicals Corp.), "Solprene" (Trade Name of the SBS block copolymer produced by the Nippon Synthetic Rubber Co., Ltd.) and "Toughprene" Trade Name of the SBS block copolymer produced by Asahi Chemical Industry Co., Ltd.).

The hot melt type tackifier composition according to the present invention contains said hydrogenated resin and a block copolymer represented by the general formula of $(A-B)_n$ or $(A-B)_{n-1}-A$ as the tackifier, and there may be added one or more of softener, plasticizer, antioxidant and/or filler, as desired.

As the examples of usable softeners, there may be mentioned liquid hydrocarbon resins such as liquid polyisobutylene and liquid polybutadiene, liquid resins such as liquid terpene resins and liquid rosin, process oils such as naphthene base process oils, aromatic process oils and paraffin series process oils, and depolymerized rubbers.

Examples of plasticizers are phthalate esters such as dioctyl phthalate and dibutyl phthalate. The mixed ratios of softener and plasticizer are not limited particularly but may be varied depending on the applied uses.

The by-product oligomers formed at the step of producing the resin of the invention of the hydrogenated oils obtained by hydrogenating such oligomers may be admixed.

Also, other tackifying resins such as rosin and derivative thereof, terpene resins or aromatic petroleum resins may be added, if necessary.

Although the mixing ratio of respective components of the hot melt type tackifier composition according to the invention is not particularly strictly limited, the representative composition contains 100 parts by weight of a block copolymer and 50 to 200 parts, preferably 70 to 150 parts, by weight, of the hydrogenated resin produced in accordance with the present invention.

The hot melt type tackifier composition may be easily obtained by mixing the ingredients of the composition generally under heating and then directly coating the molten composition on a carrier material by means of a roller coater.

The thus obtained hot melt type tackifier composition does not cause any pollution problem and has excellent heat resistant and tackifying properties superior over the known hot melt type tackifier compositions.

In order to prepare a pressure-sensitive tackifier by the use of the hydrogenated resin according to the present invention as the tackifying resin, said hydrogenated resin is mixed with any of rubbers including natural rubbers and synthetic rubbers such as isoprene rubber, styrene-butadiene copolymer rubber, butyl rubber, polybutadiene rubber, nitrile rubber, polychloroprene rubber and polyvinyl ethers. The recommended composition is composed of 100 parts by weight of a rubber or rubbers and 30 to 150 parts, preferably 50 to 100 parts, by weight, of the hydrogenated resin of the present invention.

The pressure-sensitive tackifier composition may include a softener, a plasticizer, an antioxidant and other desired materials, if necessary.

As the examples of usable softeners, there may be mentioned liquid hydrocarbon resins such as liquid polyisobutylene and liquid polybutadiene, liquid resins such as liquid terpene resins and liquid rosin, process oils such as naphthenel base process oils, aromatic process oils and paraffin series process oils, and depolymerized rubbers. Examples of plasticizers are phthalate esters such as dioctyl phthalate and dibutyl phthalate. The mixed ratios of softener and plasticizer are not limited particularly but may be varied to suit for the applied uses.

The by-product oligomers formed at the step of producing the resin of the invention or the hydrogenated oils obtained by hydrogenating such oligomers may be admixed. Also, other tackifying resins such as rosin and derivatives thereof, terpene resins or aromatic petroleum resins may be added, if necessary. The admixing operation may be effected by a roller or in a proper solvent.

The thus obtained pressure-sensitive tackifier composition is excellent in tackifying strength, adhesive strength and coagulative force, and may be coated on a carrier material to form a tack tape, label or sheet of high performance characteristics.

EXAMPLE OF THE INVENTION

The examples of the present invention will be given hereinbelow with the aim to clarifying the features of the invention more specifically. However, the present invention should not be limited only to the illustrated examples, but includes other variations and modifications embraced within the spirit thereof as defined in the appended claims. In the following Examples, parts mean parts by weight, and the softening point, the hue and the bromine value has been determined in accordance with the following methods:

Softening Point: JIS K2531-60 (Ring and Ball Test Method)
Hue: ASTM D-1544-58T (Gardner Color)
Bromine Value: JIS K2543-65

In the Tables given below, dicyclopentadiene, tetrahydroindene, vinylnorbornene, methyltetrahydroindene and vinylcyclohexene will be abbreviated, respectively, as follows:

Dicyclopentadiene: DCPD (Japanese Trademark Registration owned by Hitachi Chemical Co., Ltd).
Tetrahydroindene: THI
Vinylnorbornene: VNB
Methyltetrahydroindene: MeTHI
Vinylcyclohexene: VCH The notation of "Other Components or Others" appearing in the Tables means the ingredients other than those noted in the preceding columns and including unknown compounds, trimers, co-trimers and oligomers of higher order.

EXAMPLES 1 to 4 (Preparation of Resin)

Each of the mixtures of starting material monomers and solvent as set forth in Table 1 was charged into a 2 liter volume autoclave and heated at 260° C. for 5 hours in the $N_2$ atmosphere. After the completion of heating, the content was cooled and taken out of the autoclave, and then subjected to distillation at 210° C./2 mmHg to distill off the solvent, the unreacted materials and oligomers to obtain each of the resins as set forth in Table 2.

TABLE 1

|  |  | Example 1 | Example 2 | Example 3 | Example 4 |
|---|---|---|---|---|---|
| Component A | DCPD (%) | 30 | 40 | 55 | 40 |
| Component B | THI (%) | 48 | 41 | 30 | — |
|  | VNB (%) | — | — | — | 20 |
| Solvent | Xylenene (%) | 22 | 19 | 15 | 40 |

Comparative Example 1

Following to the general procedures as in Examples 1 to 4, except in that 30 wt % of dicyclopentadiene and 70 wt % of xylene were heated at 260° C. for 2 hours, a resin having the properties as set forth also in Table 2 was obtained. This resin will be referred to as I-a when used in the subsequent comparative Examples.

Comparative Example 2

Following to the general procedures as in Examples 1 to 4, except in that 70 wt % of dicyclopentadiene and 30 wt % of xylene were heated at 260° C. for 5 hours, a resin having the proprties as set forth in Table 2 was obtained.

EXAMPLE 5 (Preparation of Resin)

A starting monomer composition composed of 35.0 wt % of dicyclopentadiene (component A) and 46.0 wt % of tetrahydroindene and 16.0 wt % of methyltetrahydroindene (component B) was heated to polymerize similarly as in Example 1 to obtain a resin having the properties as set forth below at a yield of 52.9%. The softening point was 93.0° C., the hue was 7, the bromine value was 120, and the solubility (dilution factor by the NISSEKI No. 0 Solvent) was more than 20 times and the heat stability (the temperature raise of the softening point after being heated at 220° C. for 3 hours) was +4.0° C.

EXAMPLE 6 (Preparation of Hydrogenated Resin)

The resin obtained by Example 2 was dissolved in methylcyclohexane to prepare a 50% solution thereof, and then hydrogenated at 250° C. for 3 hours under a hydrogen pressure of 70 kg/cm$^2$ using 1% of a stabilized nickel catalyst (N-113 produced by Nikki Kagaku K.K.). After the completion of hydrogenation reaction, the catalyst was filtered off, and then methylcyclohexane was distilled off to obtain a resin having a softening point of 92.0° C., a hue of less than 1, a bromine value of 3 and a heat stability of 0° C. (change in softening point after being heated at 220° C. for 3 hours).

It should be apparent from this result that a resin having better hue and more excellent heat stability may be formed by the effect of hydrogenation.

Comparative Example 3

Similarly as in Example 1, a starting material mixture composed of 50 wt % of dicyclopentadiene and 30 wt % of 1,3-butadiene and 20 wt % of xylene as the solvent was charged and heated at 260° C. for 5 hours in the $N_2$ atmosphere. Although a highly viscous liquid resin was obtained at a yield of 60% by distilling off the unreacted materials and the solvent, no solid resin could be obtained.

EXAMPLES 7 to 12 (Preparation of Resin)

Into a 2 liter autoclave charged were each of the starting monomer compositions as set forth in Table 3 and xylene, followed by reacting under the polymerization condition as shown in Table 3 and then removing the unreacted materials, oligomers and xylene from the resultant polymer solution, whereby Resins I-1 to I-6 were obtained.

TABLE 2

|  | Example 1 | Example 2 | Example 3 | Example 4 | Comp. Ex. 1 | Comp. Ex. 2 |
|---|---|---|---|---|---|---|
| Yield (%) | 48.0 | 59.9 | 79.2 | 60.1 | 76.1 | 82.2 |
| Softening Point (°C.) | 86.5 | 112.0 | 149.0 | 114.0 | 129.0 | 150.0 |
| Hue | 7 | 7 | 8 | 7 | 10 | 11 |
| Bromine Value | 125 | 118 | 101 | 112 | 114 | 95 |
| Solubility* (times) | over 20 | over 20 | over 20 | over 20 | 1.5 | 1.0 |
| Heat Stability* (°C.) | +3.0 | +4.0 | +4.0 | +3.0 | +15.0 | +20.0 |

(Note)
Solubility: The solubility in a high boiling point solvent of paraffin series (NISSEKI No. 0 Solvent H having a boiling point ranging within 249° C. to 265° C.) was determined by adding said solvent to 1 g of each resin to know the dilution factor at the time when the solution became cloudy. Accordingly, the greater the factor, the better is the solubility.
Heat Stability: The temperature raise in softening point was measured after heating each resin at 220° C. for 3 hours. Accordingly, the less the temperature rise in softening point, the better is the heat stability.

As will be clearly seen from Table 2, the resins obtained by Examples 1 to 4 are excellent in heat stability, solubility in paraffin series solvent and hue over those of the resins obtained by Comparative Examples 1 and 2.

Comparative Example 4

150 parts of dicyclopentadiene and 850 parts of tetrahydroindene were charged into a 2 liter autoclave and reacted at 260° C. for 7 hours in the nitrogen atmosphere. The unreacted materials and oligomers were removed by distillation to obtain Resin I-b. The properties of the thus obtained resin are shown in Table 3.

TABLE 3

| | Resin No. | | | Ex. 7 I-1 | Ex. 8 I-2 | Ex. 9 I-3 | Ex. 10 I-4 | Ex. 11 I-5 | Ex. 12 I-6 | Comparative Ex. 4 I-b |
|---|---|---|---|---|---|---|---|---|---|---|
| Composition | Component A | DCPD | (parts) | 270 | 340 | 450 | 580 | 760 | 350 | 150 |
| of the | Component B | THI | (parts) | 520 | 450 | 400 | 320 | 190 | 150 | 850 |
| Starting | | VNB | (parts) | 160 | 160 | 100 | 50 | 0 | 450 | 0 |
| Material | Other Components | | (parts) | 50 | 50 | 50 | 50 | 50 | 50 | 0 |
| | Solvent | Xylene | (parts) | 0 | 0 | 0 | 0 | 100 | 0 | 0 |
| Polymerization Condition | | Temp. (°C.) | | 260 | 260 | 260 | 260 | 260 | 260 | 260 |
| | | Time (hr.) | | 5 | 5 | 5 | 5 | 5 | 7 | 7 |
| Properties | Yield of Resin (%) | | | 46.5 | 50.2 | 53.3 | 59.4 | 70.6 | 56.0 | 13.5 |
| of the | Softening Point (°C.) | | | 85.0 | 88.0 | 93.5 | 110.0 | 118.5 | 102.0 | 35.0 |
| Resultant | Bromine Value | | | 125 | 120 | 115 | 106 | 96 | 105 | 126 |
| Resin | Hue of Molten Resin (Gardner) | | | 7− | 7− | 7 | 5+ | 6 | 7+ | 8 |

EXAMPLES 13 to 18 and Comparative Examples 5 and 6

(Preparation of Hydrogenated Resin)

The resins I-1 to I-6 and I-a and I-b which had been obtained by Examples 7 to 12 and Comparative Examples 1 and 4 were hydrogenated under the conditions as set forth in Table 4 in accordance with the following procedures. 100 g of each of the Resins I-1 to I-6, I-a and I-b was charged into a 500 ml autoclave provided with a stirrer and added with 100 g of methylcyclohexane as the solvent and 3 g of a catalyst (Sulfur Resistant Stabilized Nickel N-113 produced by Nikki Kagaku K.K.). After hydrogenation under the conditions as set forth in Table 4, the reaction mixture was cooled and discharged from the autoclave. The catalyst was filtered off and the solvent was removed by distillation from each of the reaction mixtures to obtain the corresponding hydrogenated resin. The properties of the thus obtained hydrogenated resins (Resins II-1 to II-6, II-a and II-b) are also shown in Table 4.

EXAMPLES 19 to 24 and Comparative Examples 7 and 8

(Preparation of Hot Melt Adhesive and Properties Thereof)

40 parts of each of the hydrogenated resins (Resins II-1 to II-6, II-a and II-b) obtained by the preceding Examples 13 to 18 and Comparative Examples 5 and 6, 40 parts of an ethylene-vinyl acetate copolymer "EVA-FLEX 220" and 20 parts of 145° F. paraffin wax were melted and uniformly mixed together to prepare a hot melt composition. The adhesive strength of each of the thus prepared compositions was tested by measuring the peeling strengths. The peeling test was conducted in accordance with the following procedures. 5 g of each of the resultant compositions was molded in an aluminum foil of 150×200 mm in dimensions and 0.2 mm in thickness at 180° C. for 3 minutes under a pressure of 150 kg/cm².G to form a test specimen of 0.2 mm in thickness and 25 mm in width which was subjected to peeling test generally in accordance with the ASTM D1876-61T Method to determine the Al/Al peeling strength. The results are shown in Table 5.

TABLE 5

| | Ex. 19 | Ex. 20 | Ex. 21 | Ex. 22 | Ex. 23 | Ex. 24 | Comp. Ex. 7 | Comp. Ex. 8 |
|---|---|---|---|---|---|---|---|---|
| Used Hydrogenated Resin | II-1 | II-2 | II-3 | II-4 | II-5 | II-6 | II-a | II-b |
| Al/Al Peeling Strength | 2050 | 1900 | 1700 | 1300 | 1200 | 1500 | 700 | 600 |

As will be clearly seen from the results shown in Table 5, the hot melt compositions according to the present invention (Examples 19 to 24) have satisfactory peeling strengths, whereas the composition of Comparative Example 7 prepared by the use of the hydrogenated resin obtained by hydrogenating the homopolymer of dicyclopentadiene has only an unsatisfactory

TABLE 4

| | | Ex. 13 | Ex. 14 | Ex. 15 | Ex. 16 | Ex. 17 | Ex. 18 | Comp. Ex. 5 | Comp. Ex. 6 |
|---|---|---|---|---|---|---|---|---|---|
| Hydrogenated Resin No. | | II-1 | II-2 | II-3 | II-4 | II-5 | II-6 | II-a | II-b |
| Starting Resin No. Subjected to Hydrogenation | | I-1 | I-2 | I-3 | I-4 | I-5 | I-6 | I-a | I-b |
| Hydrogenation | Temperature (°C.) | 250 | 250 | 230 | 230 | 260 | 260 | 250 | 230 |
| Condition | Time (hr.) | 2 | 2 | 2 | 2 | 1 | 1 | 3 | 3 |
| | Pressure (kg/cm² · g) | 50 | 50 | 70 | 70 | 50 | 50 | 50 | 70 |
| Properties | Softening Point (°C.) | 83.0 | 86.0 | 94.0 | 110.0 | 116.0 | 100.0 | 132.0 | 33.0 |
| of the | Bromine Value | 3 | 3 | 4 | 4 | 5 | 4 | 5 | 4 |
| Hydrogenated Resin | Hue of Molten Resin (Gardner) | below 1 | below 1 | below 1 | below 1 | below 1 | below 1 | 1 | below 1 | adhesive strength. On the other hand, the result of Comparative Example 8 shows that the copolymer resin obtained from the monomer mixture containing an excess amount of the component B has a too low softening point, leading to the unsatisfactorily lowered adhesive strength of the hot melt composition containing the corresponding hydrogenated resin.

EXAMPLES 25 and 26 and Comparative Example 9

(Preparation of Resin)

Each of the starting material monomer mixtures having the compositions as set forth in Table 6 and xylene was charged into a 2 liter autoclave and allowed to react under the polymerization conditions as specified for each composition in the nitrogen atmosphere to obtain a polymer solution from which unreacted materials, oligomers and xylene were removed by distillation to obtain each of the Resins I-7, I-8 and I-c. The properties of these resins are shown in Table 6.

EXAMPLES 27 and 28 and Comparative Example 10

(Preparation of Hydrogenated Resin)

The resins I-7, I-8 and I-c which had been obtained by Examples 25 and 26 and Comparative Example 9 were hydrogenated under the conditions as set forth in Table 7 in accordance with the following procedures. 100 g of each of the Resins I-7, I-8 and I-c was charged into a 500 ml autoclave provided with a stirrer and added with 100 g of methylcyclohexane as the solvent and 3 g of a catalyst (Sulfur Resistant Stabilized Nickel N-113 produced by Nikki Kagaku K.K.). After hydrogenating under the condition as set forth in Table 7, the reaction mixture was cooled and discharged from the autoclave. The catalyst was filtered off and the solvent was removed by distillation from each of the reaction mixtures to obtain the corresponding hydrogenated resin. The properties of the thus obtained hydrogenated resins (Resins II-7, II-8 and II-c) are shown in Table 7.

EXAMPLES 29 to 34

(Preparation of Hot Melt Type Traffic Paint Composition)

Using the hydrogenated resins (Resins II-1, II-7, II-3, II-4, II-8 and II-6) produced by the preceding Examples, hot melt type traffic paint compositions were prepared in accordance with the following procedures and the properties thereof were evaluated. The results are shown in Table 8.

(Method of Preparing Hot Melt Type Traffic Paint Composition)

Using said hydrogenated resins, hot melt type traffic paint compositions were prepared by melting and mixing the following compositions at 200° C. to 210° C. for 20 minutes.

| | |
|---|---|
| Hydrogenated Resin | 15 parts by weight |
| Dioctyl Phthalate | 4 parts by weight |
| Titanium Oxide (Anatase Type) | 6 parts by weight |
| Calcium Carbonate | 15 parts by weight |
| Siliceous Sand | 45 parts by weight |
| Glass Bead | 15 parts by weight |
| | 100 parts by weight |

(Method of Evaluating the Properties)

(i) Weather-proof Test

Test specimen was prepared in accordance with the JIS K5665-1971 Method and the test specimen was subjected to the accelerated weather-proof test for 240 hours in accordance with the JIS K5400-1970 Method, wherein the test specimen was exposed to the irradiation from the untraviolet light carbon arc at 63°±3° C. while being exposed to rain for 18 minutes at every 102 minutes intervals. The yellowed degree of the coating after the test was measured and the presence or absence of cracking was observed.

TABLE 6

| | Resin No. | | | Example 25 I-7 | Example 26 I-8 | Comparative Example 9 I-c |
|---|---|---|---|---|---|---|
| Composition | Component A | DCPD | (parts) | 350 | 750 | 350 |
| of the | Component B | THI | (parts) | 450 | 170 | 0 |
| Starting | | VNB | (parts) | 150 | 0 | 0 |
| Material | Other Components | | (parts) | 50 | 80 | 0 |
| | Solvent | Xylene | (parts) | 0 | 100 | 650 |
| Polymerization Condition | | Temperature (°C.) | | 260 | 260 | 260 |
| | | Time (hr.) | | 5 | 2 | 3 |
| Properties | Yield of Resin (%) | | | 52.7 | 70.6 | 78.9 |
| of the | Softening Point (°C.) | | | 90.5 | 120.0 | 132.0 |
| Resultant | Bromine Value | | | 117 | 93 | 114 |
| Resin | Hue of Molten Resin (Gardner) | | | 7⁻ | 6 | 11 |

TABLE 7

| | | Example 27 II-7 | Example 28 II-8 | Comparative Example 10 II-c |
|---|---|---|---|---|
| Hydrogenated Resin No. Starting Resin No. Subjected to Hydrogenation | | I-7 | I-8 | I-c |
| Hydrogenation | Temperature (°C.) | 250 | 260 | 250 |
| Condition | Time (hr.) | 2 | 1 | 3 |
| | Pressure (kg/cm² · g) | 50 | 50 | 50 |
| Properties | Softening Point (°C.) | 88.0 | 117.0 | 135.0 |
| of the | Bromine Value | 3 | 5 | 5 |
| Hydrogenated Resin | Hue of Molten Resin (Gardner) | below 1 | below 1 | 1 |

(ii) Fluidity 50 g of each traffic paint composition was put into a 100 ml volume stainless steel beaker, maintained at 220° C. for 10 minutes, and then dropped onto a smooth iron plate from the height of 10 cm. The diameter of the disk-like shaped composition spread over the plate was measured.

(iii) Settling Height of Filler 50 g of each traffic paint composition was put into a 100 ml volume glass beaker, maintained at 250° C. for one hour and then allowed to stand for cooling. The solidified composition was cut along the vertical direction, and the height at which the filler settled was represented in %.

Comparative Examples 11 and 12

Using the hydrogenated resins (Resins II-b and II-c) produced by the preceding Comparative Examples, hot melt type traffic paint compositions were prepared and evaluated similarly as in Examples 29 to 34. The results are shown in Table 8.

Comparative Example 13

A hot melt type traffic paint composition was prepared similarly as in Examples 29 to 34, except in that the resin (Resin I-7) obtained by Example 25 was used without being hydrogenated, and the properties of the composition were evaluated. The results are shown in Table 8.

Comparative Example 14

Using a rosin modified resin (Softening Point: 110° C.), a hot melt type traffic paint composition was prepared similarly as in Examples 29 to 34, and the properties of the resultant composition were evaluated. The results are shown in Table 8.

On the contrary, the composition of Comparative Example 11 prepared by using the hydrogenated resin obtained by hydrogenating the homopolymer of dicyclopentadiene (homopolymer of component A) was too high in softening point and did not exhibit satisfactory weather-proof property and fluidity.

The composition of Comparative Example 12 which was prepared by using the hydrogenated resin obtained by hydrogenating the resin containing an excess amount of the component B was unsatisfactory in workability in that the softening point of the hydrogenated resin was too low and in that the settling of the filler was observed.

Comparative Example 13 was with the composition wherein non-hydrogenated copolymer resin was used to result in bad hue and appreciable yellowed degree after the weatherproof test, and it was revealed that this composition could not be used as a satisfactory traffic paint.

Comparative Example 14 prepared by the use of a prior art rosin modified resin showed cracking.

EXAMPLES 35 to 40

(Preparation of Resin)

Each of the starting material compositions shown in Table 9 was charged into a 2 liter autoclave and reacted under the polymerization condition as set forth in Table 9 in the nitrogen atmosphere to obtain a polymer solution from which unreacted materials and oligomers were removed by distillation to obtain each of Resins I-9 to I-14. The properties of the resins are shown in Table 9.

Comparative Example 15

Into a 2 liter autoclave charged was a mixed fraction which was low in dicyclopentadiene concentration as shown in Table 9, and then reacted at 260° C. for 2 hours in the nitrogen atmosphere to obtain a polymer

TABLE 8

| | Hydrogenated Resin No. | Weather-Proof Property | | Workability | |
| --- | --- | --- | --- | --- | --- |
| | | Yellowed Degree | Appearance of Coating | Fluidity (mm) | Settling Height of Filler (%) |
| Example 29 | II-1 | 0.02 | No Crack Observed | 70 | 0 |
| Example 30 | II-7 | 0.02 | No Crack Observed | 69 | 0 |
| Example 31 | II-3 | 0.03 | No Crack Observed | 68 | 0 |
| Example 32 | II-4 | 0.04 | No Crack Observed | 66 | 0 |
| Example 33 | II-8 | 0.05 | No Crack Observed | 63 | 0 |
| Example 34 | II-6 | 0.02 | No Crack Observed | 67 | 0 |
| Comp. Ex. 11 | II-c | 0.06 | Cracks Developed | 58 | 0 |
| Comp. Ex. 12 | II-b | 0.05 | No Crack Observed Guttering Observed | 73 | 30 |
| Comp. Ex. 13 | I-7 | 0.25 | No Crack Observed Appreciably Colored | 65 | 0 |
| Comp. Ex. 14 | — | 0.06 | Cracks Developed | 70 | 0 |

As will be clearly seen from the results set forth in Table 8, the hot melt type traffic paint compositions of Examples 29 to 34 showed excellent weather-proof properties in that the coating thereof after the weatherproof test were only little in yellowed degree and did not cause cracking. They also showed good workabilities in that they have improved fluidities and exhibited no settling of the fillers. Further, they had satisfactory hues prior to and after coating and they were also excellent in stain-proof properties after coating.

solution from which unreacted materials and oligomers were removed by distillation to obtain a Resin I-d. The properties of the resin are shown in Table 9.

Comparative Example 16

80.0% of dicyclopentadiene and 20.0% of xylene were charged into a 2 liter autoclave, and reacted at 260° C. for 45 minutes to obtain a polymer solution from which unreacted materials, oligomers and xylene were removed by distillation to obtain a Resin I-e. The properties of the resultant resin are shown in Table 9.

TABLE 9

|  |  | Ex. 35 I-9 | Ex. 36 I-10 | Ex. 37 I-11 | Ex. 38 I-12 | Ex. 39 I-13 | Ex. 40 I-14 | Comp. Ex. 15 I-d | Comp. Ex. 16 I-e |
|---|---|---|---|---|---|---|---|---|---|
| Composition of the Starting Material | DCPD (wt %) | 25.0 | 28.0 | 35.0 | 40.0 | 50.0 | 55.0 | 4.0 | 80.0 |
|  | THI (wt %) | 50.0 | 50.0 | 51.0 | 45.0 | 32.0 | 0 | 63.0 | 0 |
|  | MeTHI (wt %) | 15.0 | 17.0 | 10.0 | 10.0 | 8.0 | 0 | 20.0 | 0 |
|  | VCH (wt %) | 0 | 0 | 0 | 0 | 10.0 | 43.0 | 0 | 0 |
|  | VNB (wt %) | 5.0 | 0 | 0 | 5.0 | 0 | 0 | 5.0 | 0 |
|  | Others (wt %) | 5.0 | 5.0 | 4.0 | 0 | 0 | 2.0 | 8.0 | 0 |
| Solvent | Xylene (wt %) | 0 | 0 | 0 | 0 | 0 | 0 | 0 | 20.0 |
| Polymerization Condition | Temp. (°C.) | 280 | 270 | 280 | 260 | 260 | 260 | 260 | 240 |
|  | Time (hr.) | 4 | 5 | 2.5 | 3 | 2 | 1 | 5 | 0.75 |
| Properties of the Resultant Resin | Yield of Resin (%) | 58.5 | 50.9 | 59.6 | 53.6 | 49.9 | 48.0 | 12.5 | 42.3 |
|  | Softening Point (°C.) | 99.5 | 94.0 | 100.0 | 97.5 | 99.0 | 102.0 | 32.0 | 116.5 |
|  | Bromine Value | 121 | 118 | 119 | 116 | 115 | 118 | 138 | 116 |
|  | Hue of Molten Resin (Gardner) | 7+ | 5+ | 7 | 7− | 7 | 6 | 8 | 7 |

EXAMPLES 41 to 46 and Comparative Examples 17 and 18

(Preparation of Hydrogenated Resin)

The resins (Resins I-9 to I-14, I-d and I-e) obtained by Examples 35 to 40 and Comparative Examples 15 and 16 were hydrogenated under the conditions as set forth in Table 10 in accordance with the following procedures. 100 g of each of the resin (Resins I-9 to I-14, I-d and I-e) was charged into a 500 ml autoclave provided with a stirrer and added with 100 g of methylcyclohexane as the solvent and 3 g of a catalyst (Sulfur Resistant Stabilized Nickel N-113 produced by Nikki Kagaku K.K.). After hydrogenating under the condition as set forth in Table 10, the reaction product was cooled and discharged from the autoclave. The catalyst was filtered off and the solvent was removed by distillation to obtain the corresponding hydrogenated resin.

lowed to stand for cooling. The thus obtained tackifying tapes were subjected to the following tests.

(1) Tack Strength (Rolling Tack Determined by the J. Dow Method)

The tape was put on a tack strength test frame set at an inclination angle of 30° while being maintained with the surface coated with the tackifier upside. The steel balls having the diameters of 1/32 inches (No. 1 Ball) to 32/32 inches (No. 32 Ball) were allowed to roll over the coated surface after the approach run of 10 cm. The initial tack strength of each tackifier was shown by the Ball No. having the maximum diameter which was stopped by the tackifier coating.

(2) Adhesive Strength (The 180° Peeling Method)

The adhesive strength of each tackifier was determined generally in accordance with the JIS Z 1532 Method.

TABLE 10

|  |  | Ex. 41 II-9 | Ex. 42 II-10 | Ex. 43 II-11 | Ex. 44 II-12 | Ex. 45 II-13 | Ex. 46 II-14 | Comp. Ex. 17 II-d | Comp. Ex. 18 II-e |
|---|---|---|---|---|---|---|---|---|---|
| Hydrogenated Resin No. Starting Resin No. Subjected to Hydrogenation |  | I-9 | I-10 | I-11 | I-12 | I-13 | I-14 | I-d | I-e |
| Hydrogenation Condition | Temperature (°C.) | 250 | 230 | 250 | 250 | 280 | 230 | 230 | 250 |
|  | Time (hr.) | 2 | 5 | 2 | 2 | 2 | 5 | 5 | 2 |
|  | Pressure (kg/cm² · g) | 50 | 50 | 40 | 50 | 30 | 70 | 50 | 50 |
| Properties of the Hydrogenated Resin | Softening Point (°C.) | 99.0 | 95.0 | 101.0 | 97.0 | 97.5 | 103.0 | 31.5 | 112.0 |
|  | Bromine Value | 3 | 5 | 5 | 4 | 6 | 6 | 7 | 6 |
|  | Hue of Molten Resin (Gardner) | below 1 | below 1 | below 1 | below 1 | below 1 | below 1 | below 1 | below 1 |

EXAMPLES 47 to 52 and Comparative Examples 19 to 21

(Preparation and Properties of Hot Melt Type Tackifier Composition)

100 parts of each of the hydrogenated resins obtained by Examples 41 to 46 and Comparative Examples 17 and 18 was admixed with 100 parts of an SBS block polymer (produced by the Shell Chemicals Corp. under the Trade Name of "Califlex 1101"), and further added with 30 parts of dioctyl phthalate as the plasticizer and 1 part of an antioxidant to prepare a tackifier. Each of the thus prepared tackifiers was coated on a polyester sheet (25 mμ thick) at 180° C. using an applicator to form a coating of about 30μ in thickness and then al- (3) Coagulative Force (The 0° Holding Force Method)

Generally in accordance with the JIS Z 1524 Method, each specimen was applied on a stainless steel plate with the pressure contact area of 25 mm×25 mm. The specimen was fixed vertically, applied with a loading of 1 kg, and the time elapsed for the tackifying tape to be slipped down was measured. The results of these tests are shown in Table 11.

As will be apparent from the test results shown in Table 11, the tackifiers according to the present invention are excellent and well-balanced in tack strength, adhesive strength and coagulative force. Moreover, they have improved stabilities against oxidation. This has been ascertained by the fact that no gel has been formed and no change in viscosity has been occurred during the preparation of any of the tackifiers of the invention.

EXAMPLES 53 to 58 and Comparative Examples 22 to 24

(Preparation and Properties of Pressure-Sensitive Tackifier Composition)

Preparation of Specimen 8 parts of each of the hydrogenated resins obtained by Examples 41 to 46 and Comparative Examples 17 and 18 (Resins II-9 to II-14, II-d and II-e) and 10 parts of a natural rubber (pale crape No. 1) masticated to have a Mooney viscosity of 66 ($ML_{(1+4)}$ (100° C.) were dissolved in 80 parts of toluene. Each of the thus prepared tackifiers was coated on a sheet of kraft paper using a 10 mil applicator, dried at room temperature and then dried in a Geer's over maintained at 100° C. for 5 minutes. The thickness of the coating was adjusted to be 25μ using the applicator by repeatedly cutting off a portion of the coating and measuring the thickness thereof. After being dried, test specimens were allowed to stand in an air conditioned chamber (20±1° C.) for one day, and then subjected to the following tests.

(1) Tack Strength (Rolling Tack Determined by the J. Dow Method)

The coated sheet was put on a tack strength test frame set at an inclination angle of 30° while being maintained with the surface coated with the tackifier upside. The steel balls having the diameters of 1/32 inches (No. 1 Ball) to 32/32 inches (No. 32 Ball) were allowed to roll over the coated surface after the approach run of 10 cm. The initial tack strength was shown by the Ball No. having the maximum diameter which was stopped by the tackifier coating.

(2) Adhesive Strength (The 180° Peeling Method)

The adhesive strength of each tackifier was determined generally in accordance with the JIS Z 1532 Method.

(3) Coagulative Force (The 0° Holding Force Method)

Generally in accordance with the JIS Z 1524 Method, each specimen was applied on a stainless steel plate with the pressure contact area of 25 mm×25 mm. The specimen was fixed vertically, applied with a loading of 1 kg, and the slipped distance after 2 hours was measured. The smaller the slipped distance, the more intensive is the coagulative force. The results of these tests are shown in Table 12.

TABLE 11

| | Hydrogenated Resin No. | Tack Strength (Ball No.) | Adhesive Strength (g/25 mm) | Coagulative Force (min.) | Color of Tackifier |
|---|---|---|---|---|---|
| Example 47 | II-9 | 14 | 1150 | 120< | Light Yellow |
| Example 48 | II-10 | 15 | 1050 | 120< | Light Yellow |
| Example 49 | II-11 | 13 | 1200 | 120< | Light Yellow |
| Example 50 | II-12 | 13 | 1050 | 120< | Light Yellow |
| Example 51 | II-13 | 12 | 1000 | 120< | Light Yellow |
| Example 52 | II-14 | 12 | 1050 | 120< | Light Yellow |
| Comp. Ex. 19 | II-d | 5 | 450 | Fall down | Light Yellow |
| Comp. Ex. 20 | II-e | 8 | 750 | 120< | Light Yellow |
| Comp. Ex. 21 | Piccolite* S-100 | 5 | 750 | 120< | Yellow, Gel Formed |

Note: A terpene resin produced by Pennsylvania Industrial Chemical Corporation, U.S.A.

TABLE 12

| | Hydrogenated Resin No. | Tack Strength (Ball No.) | Adhesive Strength (g/25 mm) | Coagurative Force (mm) |
|---|---|---|---|---|
| Example 53 | II-9 | 10 | 580 | 0.2 |
| Example 54 | II-10 | 11 | 600 | 0.3 |
| Example 55 | II-11 | 10 | 570 | 0.2 |
| Example 56 | II-12 | 11 | 570 | 0.2 |
| Example 57 | II-13 | 11 | 560 | 0.2 |
| Example 58 | II-14 | 10 | 550 | 0.2 |
| Comp. Ex. 22 | II-d | 3 | 350 | Fall down |
| Comp. Ex. 23 | II-e | 7 | 450 | 0.3 |
| Comp. Ex. 24 | Piccolite* S-100 | 10 | 500 | 0.5 |

Note: A terpene resin produced by Pennsylvania Industrial Chemical Corporation, U.S.A.

As will be apparent from the test results shown in Table 12, the tackifiers according to the present invention are excellent and also well-balanced in tack strength, adhesive strength and coagulative force.

Although the present invention has been described with reference to the specific examples thereof, it should be understood that various modifications and variations can be easily made by those skilled in the art without departing from the spirit of the invention. It is intended to include all such modifications and variations within the wide scope of the invention as defined in the appended claims.

What is claimed is:

1. A process for producing a novel hydrogenated resin which comprises the steps of:
(i) copolymerizing a five-member cyclic compound (component A) selected from the group consisting of cyclopentadiene, dicyclopentadiene, and mixtures thereof, with a co-dimer (component B) of cyclopentadiene and 1,3-butadiene selected from the group consisting of tetrahydroindene, vinylnorbornene, and mixtures thereof, by heating a mixture of 20 to 90 parts by weight of said component A and 80 to 10 parts by weight of said component B at a temperature of from 220° to 350° C. to obtain a resin; and (ii) hydrogenating said resin to hydrogenate substantially all the carbon-carbon double bonds in the resin.

2. The process according to claim 1 wherein component A comprises at least 80% by weight of said five-member cyclic compound selected from the group consisting of cyclopentadiene, dicyclopentadiene, and mixtures thereof.

3. The process according to claim 1, wherein said mixture is a residual fraction obtained from a reaction mixture of Diels-Alder reaction of 1,3-butadiene with cyclopentadiene by distilling off the major part of vinylnorbornene as the main reaction product of said Diels-Alder reaction, said residual fraction containing 10 to 70% of dicyclopentadiene and 30 to 80% of tetrahydroindene.

4. The process of claim 3 wherein said 1,3-butadiene and cyclopentadiene mixture is heated to from 80° to 150° C.

5. The process of claim 4 wherein said residual fraction contains 20 to 40% of dicyclopentadiene and 55 to 75% of tetrahydroindene.

6. The process according to claim 1, wherein the hydrogenation at the step (ii) is effected at a temperature of from 0° C. to 350° C. and at a hydrogen pressure of from the atmospheric pressure to 200 kg/cm$^2$G.

7. The process of claim 6 wherein hydrogenation (ii) is effected at 150° C. to 260° C.

8. The process according to claim 1, wherein said hydrogenated resin has a softening point ranging from 50° C. to 160° C.

9. The process according to claim 8, wherein said hydrogenated resin has a softening point ranging from 60° C. to 130° C.

10. The process of claim 9 wherein said hydrogenated resin has a softening point from 90° C. to 110° C.

11. The process of claim 1 wherein said mixture contains 30 to 70 parts by weight of component (A) and 70 to 30 parts by weight of component (B).

12. The process of claim 11 wherein said mixture is heated to from 220° C. to 320° C.

13. The process of claim 12 wherein said mixture is heated to from 250° C. to 300° C.

14. The process of claim 11 wherein said mixture is heated from ½ to 15 hours.

15. The process of claim 14 wherein said mixture is heated from 1 to 7 hours.

* * * * *